July 20, 1965 J. T. CLANCEY ETAL 3,195,484
CONTINUOUS VACUUM FILTER AND COMBUSTION
SYSTEM UTILIZING THE SAME
Filed Sept. 24, 1962 2 Sheets-Sheet 1

INVENTORS
JAMES T. CLANCEY
ROBERT J. MEYERS
BY
D. Leigh Fowler, Jr.
ATTORNEY

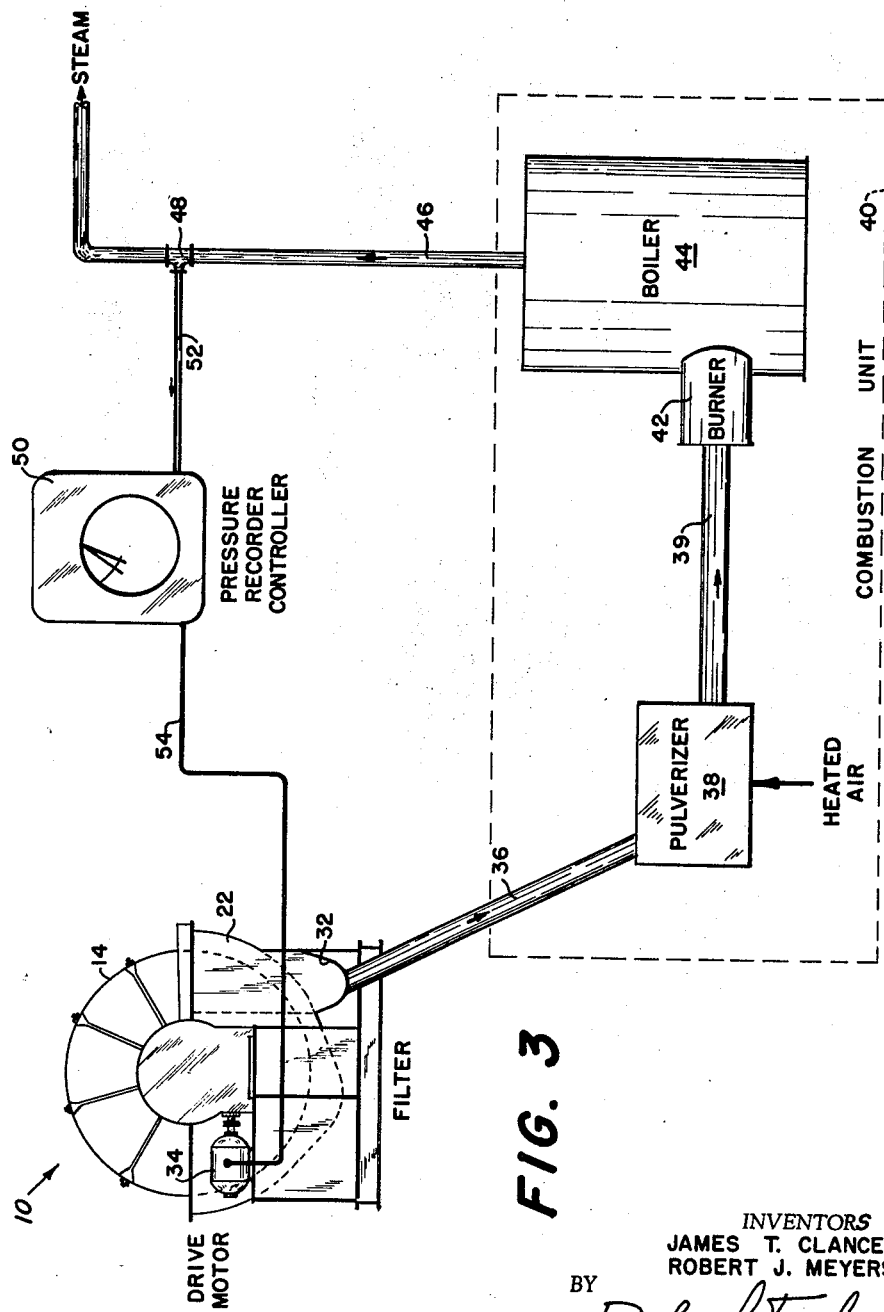

United States Patent Office 3,195,484
Patented July 20, 1965

3,195,484
CONTINUOUS VACUUM FILTER AND COMBUSTION SYSTEM UTILIZING THE SAME
James T. Clancey, Pittsburgh, and Robert J. Meyers, Bethel Park, Pa., assignors to Consolidation Coal Company, Pittsburgh, Pa., a corporation of Pennsylvania
Filed Sept. 24, 1962, Ser. No. 225,462
7 Claims. (Cl. 110—106)

This invention relates to continuous vacuum filters and more particularly to an improved filter that may be utilized in solid fuel combustion systems.

In recent years, transportation of coal by pipeline has been achieved. Coal is comminuted into relatively small particles and mixed with water for transportation though the pipeline as a slurry. In utilizing coal as it emerges from the pipeline, various systems have been employed to either dewater the coal and utilize it as a solid fuel or to utilize the liquid slurry directly as a liquid fuel.

The present invention is directed to an improved filter and method of filtration in which particulate coal and water, in slurry form, may be dewatered to recover relatively low moisture content filter cake.

While coal slurry that is transported through a pipeline offers a prime example of a coal-water mixture that may be filtered by use of the apparatus and method of the present invention, other slurries of coal and water, such as those recovered in the cleaning of coal within a preparation plant, may be filtered by the process and apparatus of this invention. Further, the present invention is also useful in filtering slurries of particulate solid material other than coal where the formation of a relatively dry filter cake is desirable.

In addition to the simple dewatering of coal slurry that has been transported by pipeline, the filter of the present invention is particularly adapted for use in a coal combustion system wherein the filter serves as a fuel feed control. The filter dewaters coal slurry immediately before the coal is fed to the combustion unit in amounts sufficient to properly control combustion of the coal within the combustion unit. Thus, the continuous filter of the present invention can be controlled so that the filter cake produced on the filter varies in amount as the requirements of a particular combustion unit vary. Accordingly, the filter of the present invention forms a major component of a novel combustion system for controlling combustion of a combustion unit.

The filter of the present invention is a conventional rotating vacuum disk filter that has been modified so that the thickness of the filter cake that is formed on the filter is limited to a predetermined maximum thickness. The filter of this invention is provided with a means for limiting the thickness of the filter cake which is deposited on the filter. Thus, the initial formation of a cake thicker than a predetermined maximum thickness is prevented, in contrast to the formation of a filter cake that is excessively thick and which, after formation, is scraped to a thinner cake by a doctor blade. The scraping of an overly thick filter cake after formation causes the excess filter cake to be returned to the slurry bath as agglomerated lumps of particulate solid which hinder further filtration from the vat.

By limiting maximum thickness of the filter cake in accordance with the present invention, a drier, more brittle filter cake is obtained since it is well recognized that a thinner filter cake may be dried more thoroughly in a given filter cycle than a thicker cake. Further, in accordance with the present invenion, the maximum thickness of the filter cake may be selected so that a filter cake of a constant thickness is formed under all operating conditions of the filter. The formation of a filter cake of constant thickness allows the quantity of solids filtered to be controlled directly by control of the rotary speed of the filter element. Thus, since the filter cake is always formed at a constant thickness, an increase in rotational speed of the filter will directly increase the solids output of the filter, whereas a decrease in rotational speed will directly decrease the amount of particulate solids that are filtered. If the filter cake is not maintained at a constant thickness, control of the rotary speed of the filter will not accurately control the amount of solids filtered. For example, a decrease in filter speed will increase the form time of the filter, resulting in a thicker filter cake whose reduced solids content is not directly proportional to the reduced speed of the disk. The controllability of the amount of solids filtered is of primary importance in combustion systems where the entire amount of fuel fed to the combustion unit comes directly from the filter. The filter of such systems can be controlled in accordance with the operating characteristics of the combustion unit to thereby control combustion.

The present invention contemplates a combustion system wherein coal slurry is filtered on the novel filter of the present invention. The particulate coal in the filter cake is then fed directly to a combustion unit. The combustion unit is metered and the result of this metering is utilized to control the rotational speed of the filter. In this way, the characteristics of the combustion unit are utilized to control the rate of fuel input to the combustion unit.

With the foregoing considerations in mind, it is a primary object of the present invention to provide an improved rotary vacuum filter.

Another object of this invention is to provide a method of filtering by which the amount of filtered solids output may be closely controlled.

Another object of this invention is to provide a method of filtering which produces a thinner, drier filter cake.

Another object of this invention is to provide a method of controlling filter cake thickness without causing lumps of filter cake to be returned to the filter vat.

A further object of this invention is to provide a method of controlling the heat output of a combustion unit.

Another object of this invention is to provide a method of controlling the steam pressure of a boiler fired by particulate coal.

Still another object of this invention is to provide apparatus for controlling the combustion of a combustion unit through control of the fuel input to the combustion unit.

These and other objects of this invention will become apparent as this description proceeds in conjunction with the accompanying drawings. In the drawings:

FIGURE 3 is a schematic drawing showing a combustion system designed in accordance with the present invention.

Figure 2:
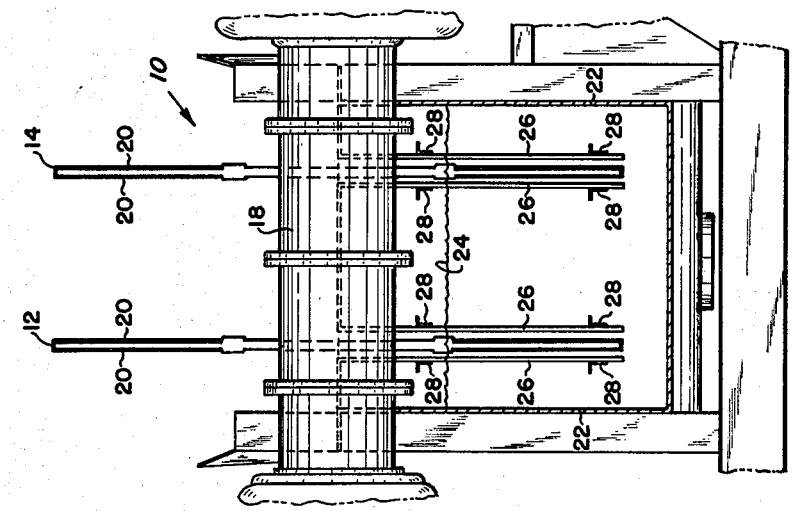
FIGURE 2 is a view of the vertical section taken along line 2—2 of FIGURE 1.
Figure 1:
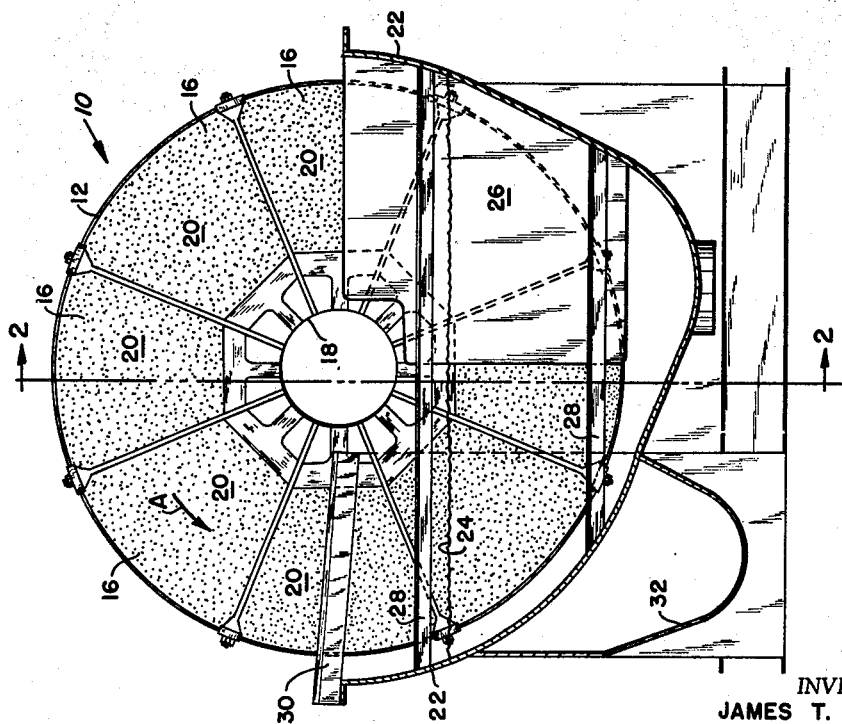
FIGURE 1 is a view in side elevation of a rotary disk filter modified in accordance with the present invention.

Referring to the drawings, and particularly to FIGURES 1 and 2, there is shown a continuous filter 10 of the rotary disk type. The rotary disks 12 and 14 are formed of a plurality of wedge-shaped segments 16 arranged around a horizontally extending shaft 18. While two disks 12 and 14 are shown, it will be appreciated that a single disk, or a greater number than two could also be utilized to practice the present invention.

Each of the wedge-shaped segments 16 has a hollow interior as is conventional in this type of filter. The flat surfaces 20 on each of the wedge-shaped segments 16 are liquid permeable so that substantially the entire circular face of each of the disks 12 and 14 is liquid permeable.

The interior of the disks 12 and 14 are, however, divided into wedge-shaped compartments by the nonpermeable walls of the segments 16.

The rotary disks 12 and 14 are rotated by horizontal shaft 18 so that the lower portions of the disks pass through a vat 22 having slurry bath therein with a liquid level indicated at 24. As the individual wedge-shaped segments 16 of the rotary disks 12 and 14 pass through the slurry within vat 22, the hollow interior of the respective segments 16 is evacuated to create a partial vacuum therein. The evacuation of the hollow interior causes liquid from the slurry to be drawn through the liquid permeable surfaces 20 while the solid particles of the slurry are deposited on the surfaces 20 as a filter cake.

The interior pressure of the wedge-shaped segments 16 is controllable through conduits (not shown) which connect the individual segments 16 to a vacuum pump (not shown) through a rotary distributor valve (not shown) that periodically causes a partial vacuum to be formed within each of the segments. During at least a portion of the period that each of the segments 16 is immersed in the slurry within vat 22, the interior of the segment is evacuated to cause a filter cake to form thereon. After a particular segment 16 leaves the slurry vat, the filter cake remains on the segment until it is removed therefrom. The interior of the individual segment may, immediately before the filter cake is removed therefrom, be either returned to atmospheric pressure, or a positive pressure may be created within the segment 16 to force the filter cake off the surfaces 20.

As described thus far, the rotary filter 10 is completely conventional and the construction described thus far forms no part of the present invention except when utilized with the modification hereinafter described. The modification in accordance with the present invention includes filter cake thickness limiting plates 26 which are positioned in parallel relation to the liquid-permeable surfaces 20 of disks 12 and 14 at a predetermined distance from the surfaces 20. The plates 26 are secured to and supported within vat 22 by horizontally extending braces 28. The plates 26 are mechanical limiting means which absolutely limit the maximum thickness of the filter cake that may be formed on the surfaces 20.

The thickness limiting plates 26 are positioned within the vat 22 so that they are a predetermined distance from the surfaces 20 of the individual wedge-shaped segments 16 during the entire time when a particular wedge-shaped segment 16 is evacuated and filter cake is being formed thereon.

As shown in FIGURE 1, the limiting plates 26 cover approximately 90 degrees of rotary travel of the filter disks 12 and 14. Thus, the disk 12 or 14 must rotate a total of 90 degrees from the time that the entire surfaces 20 of any particular segment 16 are between plates 26 until the particular segment has passed completely beyond the plates 26. When, as shown in FIGURE 1, each of the segments 16 covers approximately 45 degrees of arc of the rotary disk, the disk rotates 45 degrees from the time that the trailing edge of a particular segment enters between the plates 26 to completely place the surfaces 20 of that particular segment between the plates, until that segment's leading edge emerges from beyond the restriction of the plates 26. During that 45 degrees of travel, a partial vacuum created within the particular segment causes a filter cake to form on that segment.

In filters of other construction, the particular distance or amount of disk rotation covered by the limiting plates 26 may vary according to the distance traveled during filter cake formation. It is essential, however, that the plates be at the predetermined distance adjacent the disk during the entire time that the filter cake is being formed.

As shown in FIGURE 1, the plates 26 do not completely cover the entire cross section of the vat 22 so that a large volume of the vat is unrestricted and not substantially compartmentalized by the plates 26. The slurry 24 within the vat may circulate freely and remains homogeneous as it is filtered. The purpose of the plates 26 is not to divide the vat into compartments, but rather to limit the thickness of the filter cake that may form on the particular rotating disk.

As seen in FIGURE 2, the plates are positioned in close clearance with the rotary disks 12 and 14. The exact distance between the surfaces 20 of the disks 12 and 14 and the plates 26 will fix the maximum thickness of the filter cake that can form within the vat and the distance can be varied for various filter operating conditions to produce the type and amount of filter cake desired.

In practice, the maximum thickness of the filter cake permitted to form is substantially less than the thickness of the cake that would form at the normal rotating speed of the disks 12 and 14 with the standard vacuum force on the filter. The filter cake is maintained in a relatively thin condition by plates 26 so that the filter cake emerges from the slurry 24 within vat 22 it may be more thoroughly dried. Further, maintaining the filter cake in a relatively thin condition at constant thickness permits utilization of the filter of the present invention as a fuel control unit for a combustion system as will become more apparent in the description of the combustion system to follow.

As the rotary disks 12 and 14 rotate in the direction of arrow A (FIGURE 1) the filter cake is formed on the surfaces 20 of each segment 16 while the particular segments 16 are between the filter cake thickness limiting plates 26. After the segments emerge from between plates 26 with the filter cake thereon, the filter cake adheres to the surfaces 20 and is dried thereon until the particular segment approaches the gathering blade 30. The gathering blade 30 scrapes the filter cake from the appropriate surfaces and causes it to fall into the gathering trough 32. From gathering trough 32, the filter cake is transported to the location of ultimate use.

It should be noted that the limiting plates 26 actually limit the maximum thickness that the filter cake can assume when a filter cake is being formed. The plates 26 do not permit an excess thickness of filter cake to be formed and then remove some of that cake so that a thin filter cake leaves the bath. Rather, the formation of the cake in the first instance is limited by plates 26 so that no agglomerates of particulate material from the slurry are deposited within the bath in vat 22 thereby impeding subsequent filtration of the slurry. This feature is particularly important in utilizing the filter of the present invention to provide a drier, thin filter cake without impeding subsequent filtration.

In FIGURE 3, a combustion system for a pulverized fuel burner is shown schematically. The filter 10 of FIGURES 1 and 2, adapted to limit the maximum thickness of filter cake formed on the rotary disk 14, is shown schematically. The disk 12 is rotated within vat 22 by the filter drive motor shown schematically at 34. As the filter cake forms on disk 14, it is removed therefrom and allowed to fall into gathering trough 32. Gathering trough 32 is connected to a feed chute 36 that conducts the filter cake from disk 14 to a pulverizer 38.

Pulverizer 38 is a conventional coal pulverizer that is utilized with a pulverized fuel burner and is part of combustion unit 40. The puverizer 38 comminutes the coal particles of the filter cake until they are suitable for introduction into a pulverized fuel burner. In conventional fashion, heated air is introduced into the pulverizer 38 and entrains the comminuted coal particles.

The heated air carries the coal particles from pulverizer 38 through conduit 39 to the pulverized fuel burner 42 where they are burned. The pulverized fuel burner 42 provides the heat for boiler 44 that generates steam.

The steam generated within boiler 44 is conducted to its location for ultimate use through steam outlet line 46. The steam pressure within outlet line 46 is an indication of the heat produced within pulverized fuel burner 42 and utilized by boiler 44.

The steam outlet line 46 has formed therein a pressure tap 48. The pressure tap 48 permits the steam pressure within line 46 to be conducted to the pressure recorder controller 50 through pressure line 52.

The pressure recorder controller 50 is a commercially available instrument which continuously records the steam pressure from line 46. The controller 50 has provision for a set point of a predetermined value. The set point is the desired pressure value within line 46. The pressure recorder controller 50 can be set so that when the pressure in line 46 varies from the desired pressure by either exceeding the desired pressure or falling below the desired pressure, the pressure recorder controller 50 generates a corrective signal.

As shown in FIGURE 3, the corrective signal is an electrical impulse carried over line 54 which operatively connects the pressure recorder controller to the filter drive motor 34. The electrical impulse carried through control line 54 controls the speed of the filter drive motor so that the rotary speed of filter disk 14 can be varied by a control signal from the pressure recorder controller 50.

From the foregoing description of FIGURE 3, it will be seen that the control system of the present invention provides a fuel feed which is regulated in accordance with output characteristics of the boiler 44. The vat 22 of filter 10 is continuously supplied with coal slurry. As the filter 10 operates, in accordance with the previously described features of FIGURES 1 and 2, filter cake of a predetermined thickness is formed. The filter cake is deposited within the gathering trough 32 and conveyed directly to pulverizer 38. The filter cake is pulverized within pulverizer 38 and fed to the fuel burner 42. The entire output of the filter 10 enters pulverized fuel burner 42 a relatively short time after the filter cake leaves the filter 12. The speed of the filter disk 12 is controlled by the pressure recorder controller which increases the speed of disk 12 if the pressure within the steam line 46 is below the predetermined value. The pressure recorder controller 50 causes a decrease in the speed of the rotary disk 12 of filter 10 if the steam pressure within line 46 is higher than the predetermined value.

With the system of FIGURE 3, fuel feed to the pulverized fuel burner is a direct function of the rotary speed of filter disk 12. Since the filter cake is of uniform thickness, as insured by the mechanical limiting plates 26 of FIGURES 1 and 2, the amount of filter cake will be a direct function of the rotary speed of the filter disk. Accordingly, continuous filtration of the coal slurry shortly before combustion is now provided by the present invention.

According to the provisions of the patent statutes, we have explained the principle, preferred construction, and mode of operation of our invention and have illustrated and described what we now consider to represent its best embodiments. However, we desire to have it understood that, within the scope of the appended claims, the invention may be practiced otherwise than as specifically illustrated and described.

We claim:
1. A rotary vacuum filter comprising
 (a) a vat adapted to receive a slurry bath of particulate material suspended in a liquid,
 (b) a filter element having a hollow interior and a liquid permeable surface, said filter element operable to move through said vat, said filter element including means to evacuate said hollow interior to a pressure less than atmospheric pressure to draw said slurry liquid from said bath through said permeable surface and thereby deposit a filter cake of said particulate material on said surface, and
 (c) mechanical means positioned within said vat at a predetermined distance from said filter element liquid permeable surface, said mechanical means having openings therein for the circulation of slurry around said filter element, said mechanical means positioned in said slurry bath in a region where said filter element is subjected to a pressure less than atmospheric pressure so that the initial formation of a filter cake on said surface is limited to a thickness of said predetermined distance.

2. A rotary vacuum filter comprising
 (a) a vat adapted to receive a slurry bath of particulate material suspended in a liquid,
 (b) a disk-shaped filter element formed of a plurality of hollow wedge-shaped segments arranged radially around a horizontal shaft, said filter element operable to rotate about the axis of said shaft through said slurry bath within said vat, each of said wedge-shaped segments having at least one liquid permeable surface exposed to said slurry bath, means to evacuate each of said wedge-shaped segments to a pressure less than atmospheric pressure to draw said slurry liquid from said slurry bath through said permeable surface and thereby deposit a filter cake of said particulate material on said permeable surface, and
 (c) mechanical means having side walls positioned within said vat in parallel relation to said segment permeable surfaces at a predetermined distance from said permeable surfaces when the respective segments are evacuated to a pressure less than atmospheric pressure, said mechanical means having a bottom opening below said side walls to permit circulation of said slurry between said segment permeable surfaces and said side walls, said mechanical means constructed and positioned in said slurry bath in a region where said filter element wedge shaped segments are subjected to a pressure less than atmospheric pressure so that the initial formation of a filter cake on said permeable surfaces is limited to a thickness of said predetermined distance.

3. The rotary vacuum filter of claim 2 wherein the liquid permeable surfaces of said wedge-shaped members lie in planes normal to the axis of said horizontal shaft and wherein said mechanical means are formed of a pair of spaced solid plates fixed vertically within said vat on opposite sides of each of said permeable surfaces.

4. The method of filtration comprising the steps of
 (a) moving a vacuum-type filter element through a bath of a filterable slurry,
 (b) creating a partial vacuum within said filter element to draw the liquid of said slurry through a liquid permeable surface on said filter element thereby forming a filter cake of the solids of said slurry on said filter element,
 (c) circulating slurry around said filter element as said filter cake is being formed thereon, and
 (d) mechanically limiting to a predetermined maximum the thickness of said filter cake that can form on said filter element while said filter element is subjected to a partial vacuum and filter cake is being formed thereon.

5. The method of controlling the amount of fuel fed to a combustion unit to maintain a predetermined heat output of the combustion unit, said method comprising the steps of
 (a) rotating a vacuum-type rotary filter element through a coal-liquid slurry,
 (b) creating a partial vacuum within said filter element to draw the liquid of said slurry through a liquid permeable surface on said filter element thereby forming a filter cake of the coal particles of said slurry on said filter element,
 (c) mechanically limiting the maximum thickness of said filter cake that can form on said filter element while said filter element is subjected to a partial vacuum so that the thickness remains constant under all operating conditions,
 (d) removing said filter cake from said filter element and feeding the entire quantity of said filter cake to said combustion unit, and
(e) controlling the rotary speed of said filter element to increase said speed when said combustion unit heat output falls below said predetermined output and to reduce said speed when said combustion unit heat output surpasses said predetermined output.

6. The method of controlling the steam pressure of steam generated by a combustion unit, including a boiler having a pulverized coal burner, to maintain a predetermined steam pressure, said method comprising the steps of
(a) rotating a vacuum-type rotary filter element through a coal-liquid slurry,
(b) creating a partial vacuum within said filter element to draw the liquid of said slurry through a liquid permeable surface on said filter element thereby forming a filter cake of the coal particles of said slurry on said filter element,
(c) mechanically limiting the maximum thickness of said filter cake that can form on said filter element while said filter element is subjected to a partial vacuum so that the cake thickness remains constant under all operating conditions,
(d) removing said filter cake from said filter element and feeding the entire quantity of said filter cake to the pulverizer of said combustion unit,
(e) pulverizing the coal particles of said filter cake within said pulverizer and thereafter feeding said particles to the pulverized coal burner of said boiler,
(f) continuously metering the steam pressure of steam produced by said boiler, and
(g) controlling the rotary speed of said filter element to increase said speed when said steam pressure falls below said predetermined pressure and to reduce said speed when said steam pressure exceeds said predetermined pressure.

7. Coal feeding apparatus for a boiler heated by a pulverized fuel burner, said apparatus adapted to maintain the steam pressure of said boiler at a predetermined value, said apparatus comprising
(a) a continuous rotary vacuum filter having elements with hollow interior portions and liquid permeable surfaces, means to evacuate said hollow interior portions to a pressure less than atmospheric pressure to thereby filter a mixture of particulate coal and water to thereby form on said filter a filter cake of coal particles,
(b) filter drive means to drive said filter at variable rotary speeds,
(c) mechanical means positioned in said filter in a region where said filter element is subjected to a pressure less than atmospheric pressure to thereby limit the maximum thickness of said filter cake that can form on said filter,
(d) gathering means to remove and collect said filter cake from said filter,
(e) a coal pulverizer adapted to comminute the particulate coal of said filter cake,
(f) feed means to convey said filter cake from said gathering means to said coal pulverizer,
(g) fine coal conveying means to convey coal from said pulverizer to said fuel burner for combustion therein,
(h) a steam outlet line adapted to conduct steam from said boiler,
(i) a pressure tap formed in said steam line,
(j) control means to compare the value of steam pressure within said steam line to said predetermined value,
(k) means to operatively connect said pressure tap to said control means, and
(l) means to operatively connect said control means to said filter drive means whereby said control means causes the speed of said filter drive means to increase when said steam pressure within said steam line falls below said predetermined value and causes the speed of said filter drive means to decrease when said steam pressure within said steam line exceeds said predetermined value.

References Cited by the Examiner
UNITED STATES PATENTS

| | | | |
|---|---|---|---|
| 2,346,151 | 4/44 | Burk | 110—7 |
| 2,831,637 | 2/58 | Mittendorf et al. | 110—106 |
| 3,073,652 | 1/63 | Reichl | 302—66 |
| 3,080,064 | 3/63 | Giesse | 210—396 |

JAMES W. WESTHAVER, *Primary Examiner.*
KENNETH W. SPRAGUE, *Examiner.*